No. 746,201. PATENTED DEC. 8, 1903.
E. G. THOMAS.
WEIGHING APPARATUS.
APPLICATION FILED APR. 1, 1903.
NO MODEL.
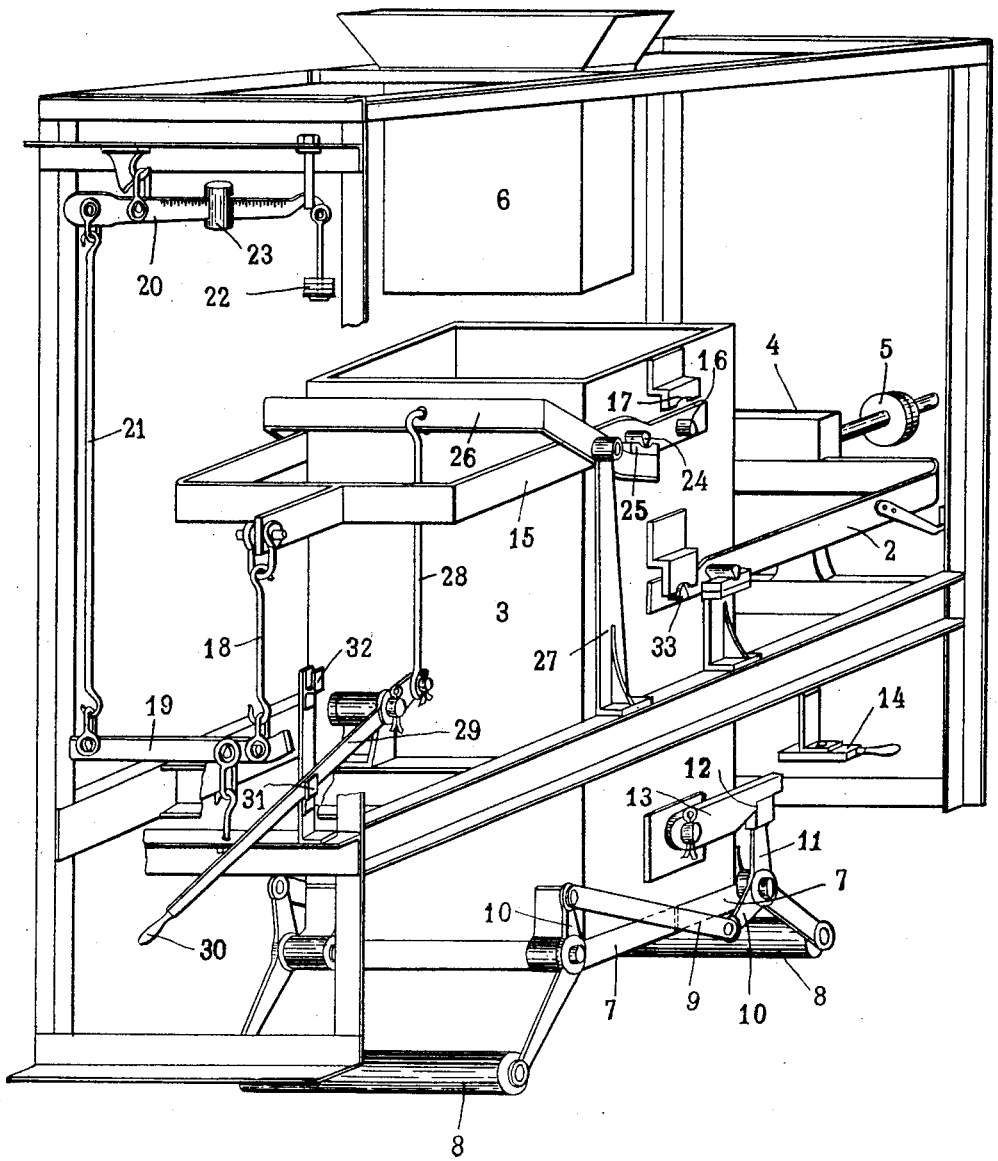
Witnesses:
Arthur F. Randall.
Joseph F. Brennan
Inventor:
Edward G. Thomas,
By E. D. Chadwick,
Attorney.

No. 746,201. Patented December 8, 1903.

UNITED STATES PATENT OFFICE.

EDWARD G. THOMAS, OF WALTHAM, MASSACHUSETTS, ASSIGNOR TO AUTOMATIC WEIGHING MACHINE COMPANY, OF NEW YORK, N. Y., A CORPORATION OF NEW YORK.

WEIGHING APPARATUS.

SPECIFICATION forming part of Letters Patent No. 746,201, dated December 8, 1903.

Application filed April 1, 1903. Serial No. 150,515. (No model.)

*To all whom it may concern:*

Be it known that I, EDWARD G. THOMAS, a citizen of the United States, and a resident of Waltham, in the county of Middlesex and State of Massachusetts, have invented new and useful Improvements in Weighing Apparatus, of which the following is a specification.

My invention is intended to provide a simple and effective arrangement by means of which the accuracy of any given operation of a weighing apparatus may be readily tested, and is designed more particularly for use in connection with automatic weighing-machines of large size or where the successive loads are so heavy that it would be impossible or inconvenient to remove in the ordinary manner a receptacle with its contained load or charge or to shift the load into a special receptacle or weighing-bucket for the purpose of reweighing it. To this end I provide, in connection with a weighing apparatus of any suitable type, a supplementary weighing apparatus normally disconnected from the main apparatus and means for shifting the weight of the weighing bucket or receptacle and its contents from the latter apparatus to the former, whereupon said bucket and contents are weighed by a hand weighing operation and then shifted back again.

My invention is illustrated in the accompanying drawing, in which the figure is a perspective view of a scale-beam and a weighing-bucket carried thereby with my improvements applied thereto.

The apparatus shown in the drawing comprises a main scale-beam 2, a weighing-bucket 3, normally carried thereby, weighing-weights 4 and 5, and a supply-chute 6. In case the bucket 3 forms part of an automatic weighing-machine it is to be assumed that the flow of material through the chute 6 to said bucket is controlled by a suitable valve or equivalent device, such a valve and its operating means not being shown and described herein, for the reason that my invention may be applied to many different types of automatic weighing apparatus, and the details of the construction of the latter are therefore not material. Means are provided whereby the discharge of a load from the bucket 3 may be prevented or temporarily arrested whenever it is desired to reweigh the load, and inasmuch as it is customary in automatic weighing-machines to cause the supply-controlling valve to be opened by the rising of the bucket after it has discharged a load the provision of means for preventing the discharge of a load from the bucket will in such case suffice to control the operation of the apparatus to the desired extent, since the valve cannot open until the bucket rises and the bucket cannot rise until it has discharged its load. In the apparatus shown in the drawing the weighing-bucket 3 is provided at its bottom with closers 7 7, each hinged to one side of the bucket and provided with a counterweight 8, the closers being connected to operate in unison by means, such as a link 9, pivoted at its ends to arms 10 10, movable with the closers, respectively. One of the closers is also provided with an arm 11, adapted to be engaged by a shoulder 12, formed on a latch 13, which is pivoted to one side of the bucket. A suitable stop, such as a pivoted arm 14, is secured to some convenient fixed point and is so arranged that it may be set in position to be engaged by the free end of the latch 13 when the bucket descends, and thus trip the latch and permit the discharge of the load from the bucket. By turning the stop 14 on its pivot, however, it may be rendered temporarily inoperative, as shown in the drawing, and in this case when the bucket 3 receives a full load and descends the latch 13 will not be tripped. The bucket will therefore retain its load until said latch is purposely tripped, during which time the operation of the automatic weighing apparatus will of course cease.

In connection with the main weighing apparatus above referred to I provide a supplementary weighing apparatus, herein shown as composed of a scale-beam 15, provided at one end with knife-edges 16, adapted to support bearings 17, secured to the bucket 3, but normally located below said bearings, said scale-beam 15 being connected at its other end, as by a link 18, to a hand weighing-scale of any suitable construction, herein shown as a scale of the well-known Fairbanks type, comprising fulcrumed levers 19 and 20, a connecting-link 21, and weighing-weights 22 and 23. In order to provide for the connecting and disconnecting of the auxiliary beam 15 and the weighing-bucket 3, I prefer to support the knife-edges 24, on which said beam poises, on movable fulcrum-blocks 25, which may be raised and lowered and thereby caused to move the knife-edges 16 into and out of engagement with the blocks 17. To this end the fulcrum-blocks 25 may be supported on a forked lever 26, pivoted to fixed supports 27, and connected by a link 28 to a suitable pressure-multiplying lever 29, one end of which serves as an operating-handle 30 and is supported in its extreme positions by means of catches 31 and 32. As thus constructed when it is desired to test the accuracy of a weighing operation the stop 14 is turned into the position shown in the drawing to prevent the discharge of the load to be tested, and after the said load has been delivered to the weighing-bucket and the latter has descended the handle 30 is forced upward, thereby lifting the fulcrum-blocks 25 and beam 15 and causing the knife-edges 16 to engage the blocks 17 and lift the bucket 3 off the knife-edges 33 on the scale-beam 2, which normally support it. This operation results in throwing the weight of the bucket and its contents onto the auxiliary beam 15, which weight is then determined by a hand weighing operation performed on the scale-beam 20 in the usual manner. It will be found convenient to employ a permanent weight 22 just sufficient to balance the bucket 3 when empty, so that the net weight of the load may be found at once by means of the weight 23. After the hand weighing operation has been performed the handle 30 is lowered, thereby lowering the bucket 3 onto the knife-edges 33, the downward movement of the fulcrum-blocks 25 being continued until the knife-edges 16 are wholly disconnected from and out of contact with the blocks 17. The bottom of the weighing-bucket is then unlatched and permitted to discharge the load just weighed, and the operation of the main weighing apparatus thereupon proceeds in the usual manner.

I do not consider my invention to be limited to any particular type or construction of weighing apparatus, since so far as I am aware I am the first to combine a main weighing apparatus, a supplementary weighing apparatus, and means for shifting the weight of the weighing bucket or receptacle and its load from the former to the latter and back again in such manner that the weight of said load may be determined independently of the main weighing apparatus.

I claim as my invention—

1. The combination with a main weighing apparatus, a weighing-receptacle normally carried thereby, and means for controlling the discharge of material from said receptacle, of a supplementary weighing apparatus and means for transferring the weight of the weighing-receptacle and its contents from the main weighing apparatus to the supplementary weighing apparatus and back again, for the purpose set forth.

2. The combination with a primary scale-beam and a weighing-receptacle carried thereby, of a supplementary scale-beam normally disconnected from the weighing-receptacle, and means for transferring the weight of said receptacle and its contents from the primary scale-beam to the supplementary scale-beam and back again, for the purpose set forth.

3. The combination with a primary scale-beam, a weighing-receptacle carried thereby and provided with closers, a latch for said closers, and means for controlling said latch, of a supplementary scale-beam, weight-determining means connected thereto, and means for transferring the weight of said receptacle and its contents from the primary scale-beam to the supplementary scale-beam and back again.

4. The combination with a primary scale-beam, a weighing-receptacle carried thereby, and means for controlling the discharge of material from the receptacle, of a pivoted lever carrying bearing-blocks, a supplementary scale-beam supported on said bearing-blocks and provided with knife-edges adapted to engage bearing-blocks carried by said receptacle, means for performing a weighing operation on said supplementary scale-beam, and means for operating said lever to shift the weight of the weighing-receptacle and its contents from the main scale-beam to the supplementary scale-beam and back again, for the purpose set forth.

5. The combination with a main scale-beam, a weighing-receptacle supported thereon, supplementary bearing-blocks carried by said receptacle, and means for controlling the discharge of material from said receptacle, of a pivoted lever carrying bearing-blocks, a supplementary scale-beam mounted to poise on said bearing-blocks and provided with knife-edges adapted to be engaged with and disengaged from the supplementary bearing-blocks carried by the weighing-receptacle, a weighing-beam 20 provided with weighing-weights, connections between the same and the supplementary scale-beam, and means for temporarily locking said pivoted lever in position to render the supplementary scale-beam operative.

In testimony whereof I have hereunto subscribed my name this 27th day of March, 1903.

EDWARD G. THOMAS.

Witnesses:
E. D. CHADWICK,
JOSEPH T. BRENNAN.